United States Patent [19]
Chai et al.

[11] 3,867,676
[45] Feb. 18, 1975

[54] VARIABLE RELUCTANCE LINEAR STEPPER MOTOR

[75] Inventors: Hi D. Chai, Binghamton; Joseph P. Pawletko, Endwell, both of N.Y.

[73] Assignee: International Business Machines Corporation, Armonk, N.Y.

[22] Filed: Sept. 20, 1973

[21] Appl. No.: 399,225

[52] U.S. Cl............... 318/135, 318/687, 310/14
[58] Field of Search............... 318/37, 38, 135, 687; 310/12–14, 28, 30, 49 R, 127

[56] References Cited
UNITED STATES PATENTS

| | | | |
|---|---|---|---|
| 3,265,911 | 8/1966 | Madsen................... | 310/12 |
| 3,268,747 | 8/1966 | Snowdon................... | 310/13 |
| 3,336,488 | 8/1967 | Scott....................... | 310/30 X |
| 3,353,040 | 11/1967 | Abbott....................... | 310/27 |
| 3,366,809 | 1/1968 | Scott....................... | 310/28 X |
| 3,441,819 | 4/1969 | Palmero................... | 310/12 UX |
| 3,453,510 | 7/1969 | Kreuter et al............. | 310/14 X |
| 3,575,650 | 4/1971 | Fengler................... | 318/135 |

FOREIGN PATENTS OR APPLICATIONS

1,135,765    12/1968    Great Britain............ 310/14

OTHER PUBLICATIONS
IBM Tech. Disclosure Bulletin, "Linear Incremental Motor," Thompson, Vol. 6, No. 9, 2/64, pp.19–20.

*Primary Examiner*—Donovan F. Duggan
*Attorney, Agent, or Firm*—Norman R. Bardales

[57] ABSTRACT

The poles of a variable reluctance type linear stepper motor are arranged in an odd plural number of pairs and each pole is provided with two windings. For each pole pair, one winding of the pole of the particular pair is connected in series-aiding relationship with one of the windings of the other pole of the pair. The other two windings of the particular pair of poles are also connected in series-aiding relationship. The series connected windings are selectively energizable in predetermined stepping sequences for single phase, double phase and alternate single and double phase energizing operational modes. As a result, relative motion is provided between the pole structure of the motor and its variable reluctance member. The directions of energization of the respective two series connected windings of each particular pole pair are in opposition with respect to each other. The energization is such that the change of direction of the flux through the poles is minimized between steps, thereby providing a concomitant reduction in electrical and/or heat losses.

8 Claims, 22 Drawing Figures

TIME →
SINGLE PHASE

FIG. 5a

TIME →
TWO PHASE

(ALTERNATE SINGLE AND TWO PHASE) TIME →

VARIABLE RELUCTANCE LINEAR STEPPER MOTOR

BACKGROUND OF THE INVENTION

1. Field of the Invention

This invention is related to linear stepper motors, and more particularly, to linear stepper motors of the variable reluctance type.

2. Description of the Prior Art

The winding configurations and/or interconnections thereof utilized in certain prior art linear stepper motors of the variable reluctance type resulted in electrical and/or heat losses in the motor. As a result, the prior art devices are bulky, not susceptible to smooth operation, and/or less efficient.

SUMMARY OF THE INVENTION

It is an object of this invention to provide a linear stepper motor of the variable reluctance type which is more efficient, susceptible to smooth operation, and/or relatively less bulky.

Another object of this invention is to provide a linear stepper motor of the variable reluctance type which minimizes electrical and/or heat losses, and/or is capable of faster operation.

According to one aspect of the present invention there is provided a linear stepper motor which is of the variable reluctance type and has a predetermined reference axis. The motor comprises first magnetic member means which has first and second surfaces disposed on first and second opposite sides, respectively, of the reference axis. The first member means has a predetermined variable reluctance characteristic at the first and second surfaces. The motor has second magnetic member means which has an odd plural number of pole pairs of electromagnetic poles with respective pole faces. The pole face of one pole of each pole pair is disposed on the first side of the reference axis in juxtaposition with the first surface. The pole face of the other pole of each pole pair is disposed on the second side of the reference axis in juxtaposition to the second surface. A predetermined one of the first and second member means have first and second spaced sub-members disposed on the aforesaid first and second opposite sides, respectively, of the reference axis. The other one of the first and second member means is disposed between the first and second sub-members. The motor has means for providing relative support between the first and second member means. Each of the poles has first and second windings. The first windings of the poles of each particular pole pair are electrically interconnected in series-aiding relationship. The second windings of the poles of each particular pole pair are also electrically interconnected in series-aiding relationship. Also provided are means for selectively energizing in predetermined stepping sequences the series connected first and second windings for single phase, double phase, and alternate single phase and double phase energizing operational modes to provide relative movement between the first and second member means. The selective energizing means is operative during each one of the operational modes to energize the series connected first windings of each particular pole pair in a direction opposite to the direction of energization of the series connected second windings of the particular pole pair. The energizing means during each successive step is operative to energize the series connected winding selected during each successive step to provide a magnetic flux in the same direction through the pole pair associated with the series connected winding selected in the preceding step as the direction of the magnetic flux passing through the lastmentioned pole pair during the aforementioned preceding step.

The foregoing and other objects, features, and advantages of the invention will be apparent from the following more particular description of the preferred embodiments of the invention as illustrated in the accompanying drawing.

BRIEF DESCRIPTION OF THE DRAWING

In the figures, like elements are designated with similar reference numerals.

DESCRIPTION OF THE PREFERRED EMBODIMENTS

Figure 1:
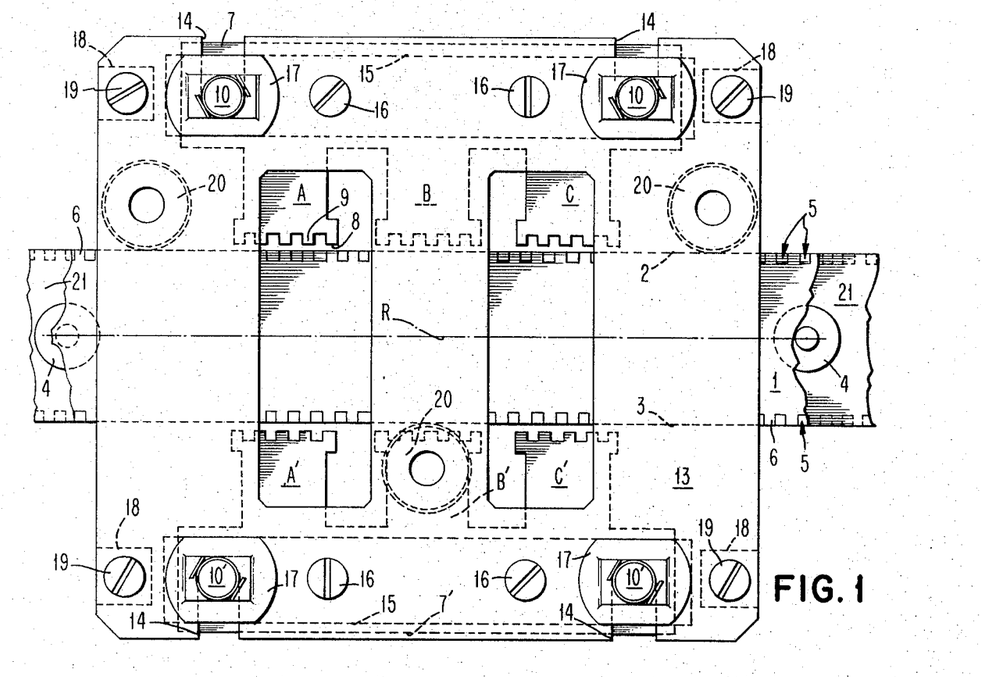
FIG. 1 is a side elevation view of a preferred embodiment of the invention.
Figure 2:
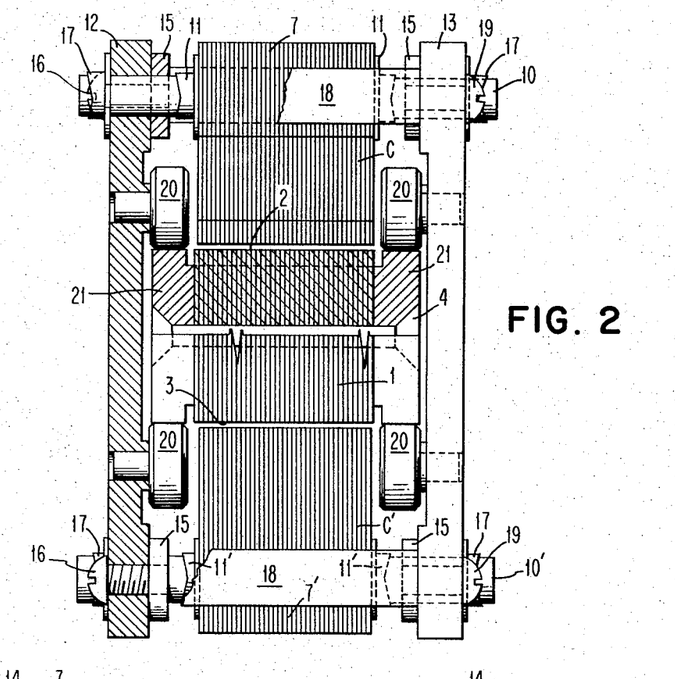
FIG. 2 is an end elevation view, partially broken away for sake of clarity, of the embodiment of FIG. 1.

Referring now to FIGS. 1 and 2, there is shown a preferred embodiment of the variable reluctance type linear stepper motor of the present invention. It includes a first magnetic member means 1 which has first and second surfaces 2, 3 disposed on first and second opposite sides of a reference axis R, which in the preferred embodiment is the longitudinal central axis of symmetry of the motor. Member means 1 has a predetermined variable reluctance characteristic at the first and second surfaces 2, 3.

More particularly, in the embodiment of FIGS. 1 and 2, member means 1 is preferably formed from a stack of rectangular elongated laminations which are secured together by suitable means such as, for example, the rivets 4 located at suitable intervals. The cross-sectional area, as viewed in FIG. 2, of the stack of laminations of means 1 is normal to the reference axis R. Formed across the surfaces 2, 3 are parallel grooves 5 which are transverse to and preferably normal to the axis R. The projections or teeth 6 formed between grooves 5 have a uniform width Wt and tooth pitch Pt, cf. FIG. 3. The teeth 6 on the surfaces 2 and 3 are aligned and have the same uniform height. In this manner, member means 1 of FIGS. 1 and 2 is provided with the aforementioned variable, i.e., alternate, reluctance characteristic due to the alternate differences in height between surfaces 2 and 3. That is to say, the height between the aligned grooves 5 of the surfaces 2 and 3 is smaller than the height between the aligned teeth 6 thereof. Other alternative ways may be employed to provide the alternate reluctance characteristic. For example, the member means 1 may be made of a stack of parallel rectangular plate-like members having the same thicknesses between the surfaces 2, 3 and whose planar surfaces are orthogonal to the axis R. To provide the alternate reluctance characteristic each of the alternate members of the stack is provided with one reluctance value and each of the other members of the stack is provided with another reluctance value.

The second magnetic member means 7-7' of the preferred embodiment of FIGS. 1 and 2 includes three pole pairs A-A', B-B', C-C' of electromagnetic poles, the individual poles of which pairs are designated with the respective reference characters A, A', B, B', C, and C' for sake of clarity. Each of the poles has a pole face, e.g., pole face 8 of pole A, with the pole faces of poles A, B, C being disposed on one side of the reference axis R in juxtaposition with the surface 2 of member means 1. The pole faces of poles A', B', and C' are similarly disposed on the other side of the reference axis R in juxtaposition to the surface 3.

In the preferred embodiment of FIGS. 1 and 2, the pole faces, e.g., pole face 8, are provided with a number of teeth 9 which have the same width Wt and pitch Pt as the teeth 6 of member means 1. Also, in the preferred embodiment of FIGS. 1 and 2, member means 7-7' is comprised of two sub-members 7 and 7' which are disposed on the opposite sides of the reference axis R and member means 1 is disposed between the two sub-members 7 and 7'. Sub-members 7 and 7' are separate identical laminated structures. Sub-members 7 includes the poles A, B and C and sub-member 7' includes the poles A', B', and C'.

The laminations of sub-member 7 are assembled on the pins 10 and secured thereto by the lock springs 11. In a similar manner, the laminations of sub-assembly 7' are assembled on and secured to the pins 10' by the lock springs 11'.

Member means 1 and member means 7-7' are mounted for relative motion with respect to each other. In the embodiment of FIG. 1, member means 1 is stationary and the member means 7-7' is capable of movement bi-directionally along the axis R. As shown in FIGS. 1 and 2, sub-member 7 and 7' are mounted between two side frames 12 and 13. The frames are provided with appropriate grooves, e.g., grooves 14, in which are seated the extended end portions of the pins 10, 10'. The pins 10, 10' pass through suitable apertures provided in the rectangular brackets 15. The brackets 15 in turn are secured to the inwardly-facing walls of the frames 12 and 13 by suitable means such as the bolts 16. Lock springs 17 secure the pins 10, 10' to the outer face of the respective side frames 12 and 13.

To maintain the side frames 12, 13 in a fixed spaced relationship, four identical spacer bars 18 are provided between their respective inner faces and secured thereto by suitable bolts 19. By judiciously selecting spacer bars 18 with different overall lengths, the magnetic material used in the motor may be tailored according to the desired requirements by adding or subtracting, as the case might be, one or more laminations to the member means 1 and 7-7'.

In the preferred embodiment, the relative motion between the members 1 and 7-7' are provided by the rollers 20 which are journaled in the respective side frames 12 and 13. The rollers 20 co-act with the rails of rail plates or members 21 which are affixed to the sides of the member means 1. To provide mechanical stability, three rollers 20 are used on each side of the member means 1, two of which coact with the upper rail of their respective rail member 21 and the other of which co-acts with the lower rail, as illustrated in FIG. 1. Alternatively, other means for providing support between the members 1 and 7-7' for relative movement along the axis R may be provided, such as for example, by providing a self-lubricating bearing material on the pole faces of A, B, C, A', B', and C' and/or the surfaces 2 and 3 of the member means 1.

Preferably, with the exception of the member means 1 and 7-7', the other components 10-21 are made of non-magnetic or negligibly magnetic materials. Accordingly, the flux paths will be confined substantially within the magnetic member means 1 and 7-7' and in particular will pass through the inner member means 1 in a direction substantially transverse to the reference axis R. The magnetic circuit of the motor of FIGS. 1-3, thus has three parallel paths which include the three pole pairs A-A', B-B', C-C', the intervening portions of member means 1 which are between the respective pole faces of each pole pair, and the associated air gap between means 1 and 7-7'.

Figure 3:
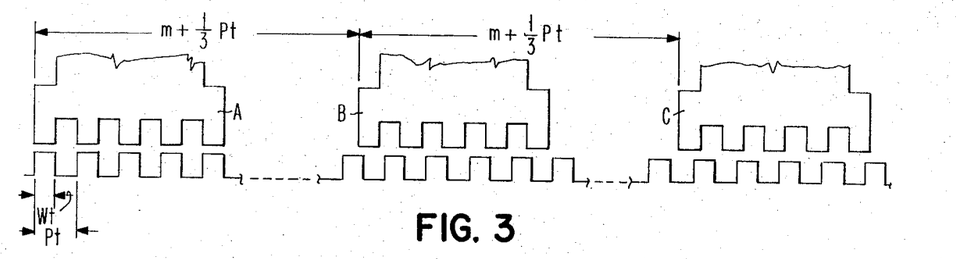
FIG. 3 is a partial schematic view illustrating certain spacing relationships of the pole structure and variable reluctance members of the embodiment of FIG. 1.

Before describing the windings associated with the six poles A-C' of the electromagnets of the motor of the embodiment of FIGS. 1-3, there is shown in FIG. 3 the spacing relationship between the poles. In FIG. 3, only the upper poles A, B, and C are partially shown with respect to the partially shown side 2 of the member means 1 for sake of clarity. It should be understood, however, that the spacing relationship between the poles A', B', and C', are the same, and that the two poles, and more particularly their respective pole faces, of each pole pair, A-A', B-B', C-C', are in alignment with respect to each other. In general, the spacing or pole pitch Pt between adjacent poles is given by the equation:

$$Pp = (m+1/n)Pt \tag{1}$$

where $m =$ a positive integer, the minimum of which is equal to the number of teeth provided on a pole face,
$n =$ the number of pole pairs, and
$Pt =$ the tooth pitch of the variable reluctance member.

For the embodiment of FIG. 3, $m = 5$ and $n = 3$.

Figure 4:
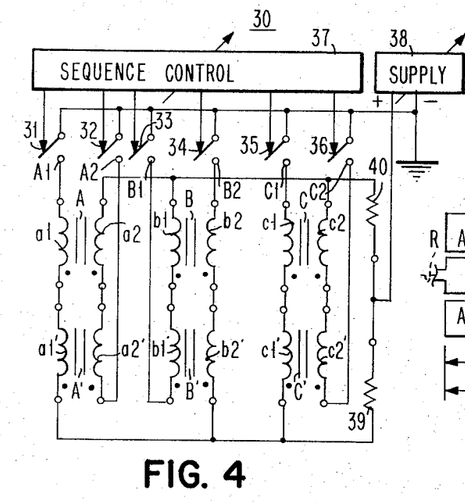
FIG. 4 is a schematic view, partially in block form, of the energization means and windings of the electromagnets of the embodiment of FIG. 1.

Referring now to FIG. 4, each pole has two windings, which are preferably bifilar to provide each winding with equal characteristics. The poles A, B, C, A', B', C' are each provided with two windings designated by the reference characters $a1$ and $a2$, $b1$ and $b2$, $c1$ and $c2$, $a1'$ and $a2'$, $b1'$ and $b2'$, and $c1'$ and $c2'$, respectively. In FIGS. 1-3, the windings are omitted for sake of clarity. One winding of each pole is designated as the first winding and the other as the second winding. The first windings of the same pole pair, e.g., windings $a1$ and $a1'$ of the poles A and A' of pole pair A-A', are electrically interconnected in series-aiding relationship. The other or second windings of the same pole pair, e.g., windings $a2$ and $a2'$ of poles A and A' of the pole pair A-A', are likewise interconnected in series-aiding relationship. In the preferred embodiments, the series connected first windings are oppositely poled with respect to the series connected second windings of the particular pole pair. Moreover, as shown in FIG. 4, the series connected windings $a1-a1'$, $b2-b2'$, and $c1-c1'$ are poled in one direction, and the series connected windings $a2-a2'$, $b1-b1'$, and $c2-c2'$ are poled in the opposite direction.

Selective energizing means, indicated generally by the reference numeral 30, energizes the series connected first and second windings in predetermined stepping sequences for single phase, double phase, and alternate single phase and double phase energizing operational modes so as to provide the aforementioned relative movement between the first and second member means 1 and 7-7'. The selective energizing means 30 includes schematically shown normally open transistorized switches 31-36 which are controlled by an adjustable sequencer 37. Switches 31-36 are connected to the schematically shown grounded terminal of an energization supply 38. Supply 38 is capable of providing both positive and negative energization. The illustrated conventional non-dot ends of the three sets of series connected windings $a1-a1'$ $b2-b2'$, $c1-c1'$ are connected to the switch contacts A1, B2, C1, respectively, and the conventional dot ends of the three sets of series connected windings $a1-a2'$, $b1-b1'$, $c2-c2-c2'$ are connected to the switch contacts A2, B1, C2, respectively. The dot ends of the three sets of series connected windings $a1-a1'$ $b2-b2'$, and $c1-c1'$ are commonly connected to the ungrounded terminal of the supply 38 via the common current limiting resistor 39. Similarly, the non-dot ends of the three sets of series connected windings $a2-a2'$, $b1-b1'$, and $c2-c2'$ are commonly connected via the current limiting resistor 40 to the ungrounded terminal or the supply 38. As shown in FIG. 4, for any of the pole pairs, means 30 will energize the two sets of series connected windings thereof in opposite directions for a given polarity of supply 38.

Figure 5A:
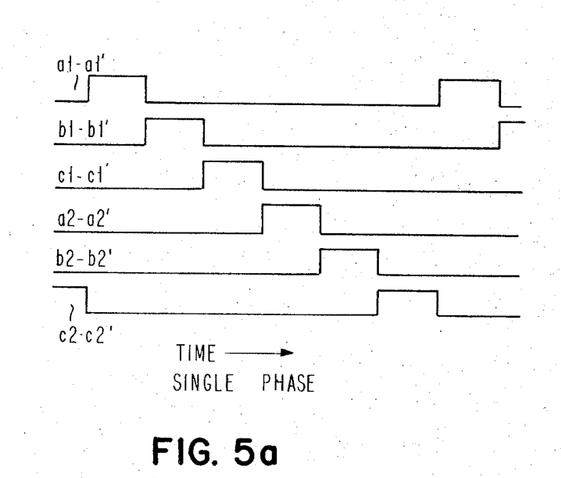
FIGS. 5a–5c are idealized waveform diagrams useful in explaining the single phase, double phase and alternate single and double phase operational modes, respectively, of the embodiment of FIG. 1.
Figure 5B:
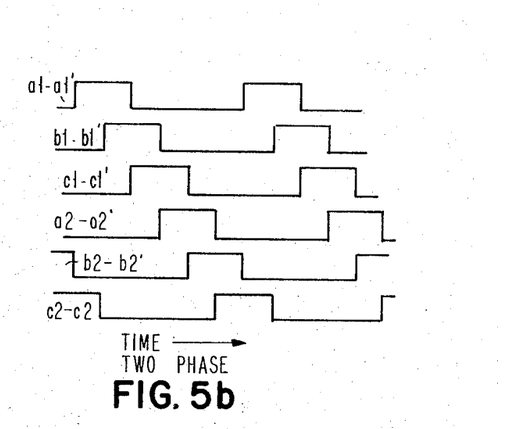
Figure 5C:
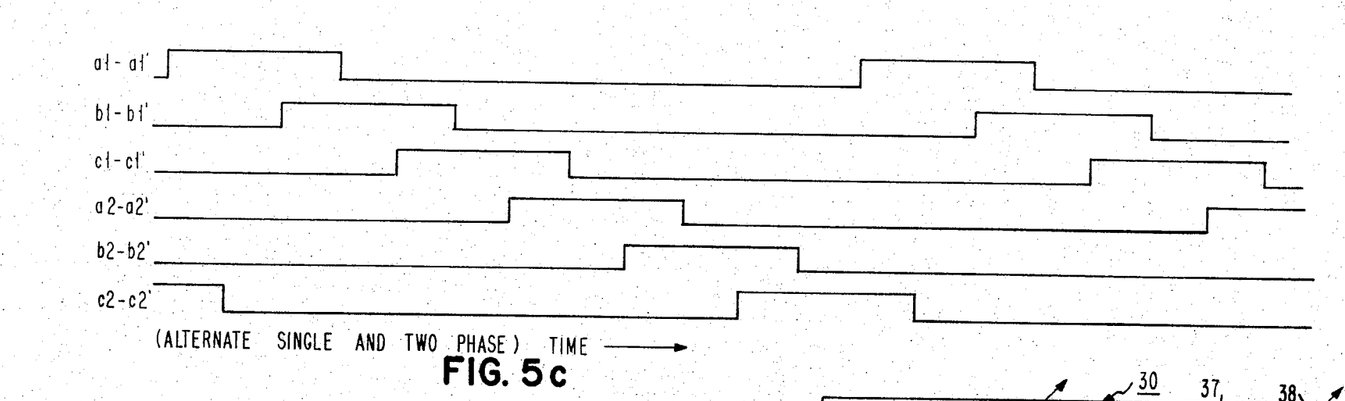

Referring to FIGS. 5a–5c, the series connected windings are operable in single phase, double, i.e., two, phase or alternate single phase and double phase energizing operational modes. As used herein, a single phase operational mode means that only one set of the six sets of series connected windings is energized at a time in incrementing or stepping the motor from one step or detent position to the next. By way of example, there is shown in FIG. 5a idealized energization waveforms for operating the motor of FIGS. 1–3 in a single phase operational mode in one of the directions along axis R. For the particular example of FIG. 5a, the six sets of series connected windings are energized in the sequence $a1-a1'$, $b1-b1'$, $c1-c1'$, $a2-a2'$, $b2-b2'$, $c2-c2'$, whereupon the sequence repeats.

In a two-phase operational mode, as used herein, two sets of the series connected windings associated with two different pole pairs are concurrently energized in incrementing the motor. By way of example, the idealized waveforms of FIG. 5b illustrate an energization sequence for operating the motor of FIGS. 1–3 in a two-phase operational mode in one of the directions along axis R. For the particular example of FIG. 5b, the six sets of series connected windings are energized concurrently in pairs in the sequence $c2-c2'$ and $a-a1'$, $a1-a1'$ and $b1-b1'$, $b1-b1'$ and $c1-c1'$, $c1-c1'$ and $a2-a2'$, $a2-a2'$ and $b2-b2'$, $b2-b2'$ and $c2-c2'$, whereupon the sequence is repeated.

In an alternate single phase and double phase operational mode and as used herein, the motor is incremented alternately by single phase and double phase operational modes. Again, by way of example, the idealized waveforms of FIG. 5c illustrates an alternate single phase and double phase operational mode for incrementing the motor of FIGS. 1–3 in one of the directions along the axis R. For the particular example of FIG. 5c, the six sets of series connected windings are energized in the sequence $c2-c2'$ and $a1-a1'$, $a1-a1'$, $a1-a1'$ and $b1-b1'$, $b1-b1'$, $b1-b1'$ and $c1-c1'$, $c1-c1'$, $c1-c1'$ and $a2-a2'$, $a2-a2'$, $a2-a2'$ and $b2-b2'$, $b2-b2'$, $b2-b2'$ and $c2-c2'$ $c2-c2'$, whereupon the sequence is repeated.

In single or double phase operational modes, the motor is incremented one full step at a time. In the alternate operational mode, the motor is incremented a half step at a time. Each time the motor is to be incremented one step, it may be incremented in either one of two directions along axis R as desired. To reverse the motor's direction, the energization sequence is reversed.

In accordance with the principles of the present invention, the energizing means 30 during each successive step energizes the selected series connected windings so as to provide a magnetic flux in the pole pairs associated with the series connected windings selected in the preceding step in the same direction as the direction of the magnetic flux passing through the lastmentioned pole pair during the preceding step. While it is possible to obtain this flux relationship using only one winding per pole in an even number pole pair linear stepper motor, it is impossible to do so for an odd number pole pair linear stepper motor having only one winding per pole. This will become apparent with the description with reference to FIGS. 6a–6f and FIGS. 7a–7f, next to be described.

Referring now to FIGS. 6a–6f, there are shown the main flux paths through the motor of FIGS. 1–3 when energized in a single phase operational mode. For sake of explanation, FIGS. 6a–6f correspond to the energization sequence shown in FIG. 5a.

To energize the series connected windings $a1-a1'$, sequence control 37 provides a control signal which closes switch 31 and maintains the other switches 32-36 in their respective open positions. Under these circumstances, the set of series connected windings $a1-a1'$ are connected across the terminals of the supplyy 38. For sake of explanation, it is assumed that the polarity of the supply 38 is such that current flowing through windings $a1-a1'$ produce a flux in the poles A and A' in the downward direction as shown by the solid line 41 in FIG. 6a. The resultant magnetic field caused by the flux passing between the poles A and A' causes the means 7-7' to move so that the teeth 9 of the poles A and A' are in alignment with the teeth 6 on the surfaces 2 and 3 of means 1. As a result, the motor will be detented to the position shown in FIG. 6a. With the spacing relationship of equation (1) above, only one-third of each tooth 9 of the other poles will be in alignment with a corresponding one-third portion of a tooth 6 of means 1. More particularly, as viewed facing FIG. 6a, the left hand one-third portion of the teeth 9 of poles B and B' are aligned with the right hand one-third portions of the teeth 6. On the other hand, the right hand-one-third portions of the teeth 9 of the poles C and C' are aligned with the one-third left hand portions of the teeth 6. Accordingly, the forces interacting between the means 1 and 7-7' which are caused by the flux 41 produced by the energized windings $a1-a1'$ are substantially in a balanced or equilibrium condition. Using the teeth 6a, 6b, and 6c as reference points, FIG. 6b will next be described.

Figure 6A:
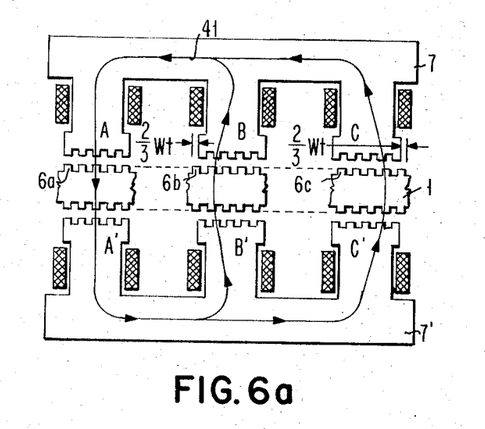
FIGS. 6a–6f and 7a–7f are partial schematic diagrams of the pole structure and variable reluctance members of the embodiment of FIG. 1 illustrating the relative detent positions thereof and the flux paths therethrough at different incrementing steps for single and double, respectively, phase operational modes.
Figure 6B:
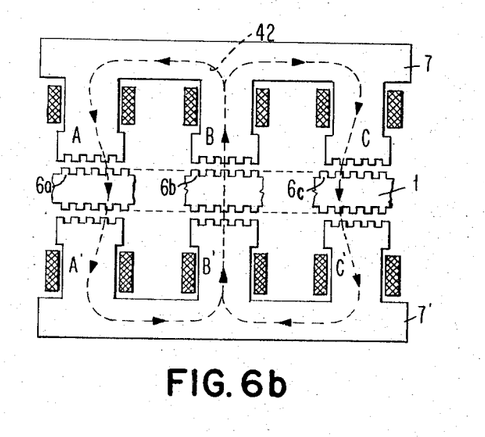

In FIG. 6b, the series connected windings $b1-b1'$ are energized by appropriate action of the sequencer 37 which causes switch 31 to open and switch 32 to close. The current flow through the windings $b1-b1'$ is such that the flux produced thereby, as indicated by the dash line 42, is in the upward direction as viewed facing FIG. 6b. As a result, the interacting magnetic forces between the means 1 and 7-7' are unbalanced. This causes means 7-7' to move to the left from its position of FIG. 6a to its position of FIG. 6b so that the teeth 9 of poles B and B' are in alignment with the teeth 6 of means 1. In this position, the forces are returned to a stable or balanced condition. The means 7-7' in going from the position of FIG. 6a to that of FIG. 6b is incremented a full step, which is equal to two-thirds of the tooth width Wt. Again, there is a corresponding one-third alignment relationship with the teeth 6 of means 1 and the teeth 9 of the pole pairs A-A' and C-C'. With these alignment relationships of the teeth 9 of the three pole pairs with the teeth 6 of means 1, there is obtained the aforementioned stable resultant balance condition between the forces interacting between member means 1 and 7-7' due to the flux 42. It should be noted that the energized series connected windings $b1-b1'$ provide a magnetic flux 42 through the pole pair A-A' in FIG. 6b which is in the same direction as the direction of the magnetic flux 41 passing through the pole pair A-A' in FIG. 6a.

Figure 6C:
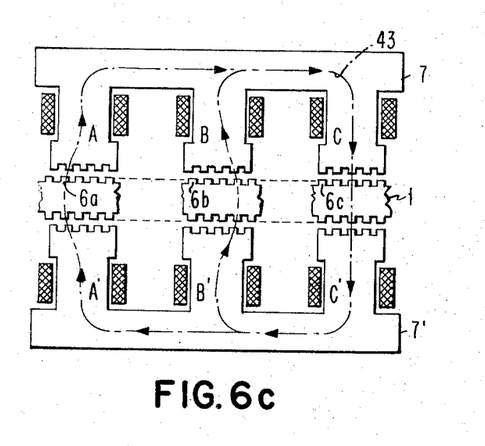

In FIG. 6c, the windings $c1-c1'$ are next energized via an appropriate action of the sequencer 37 which causes switch 32 to open and switch 33 to close. As a result, a flux, indicated by the dash-dot line 43, is produced in poles C-C' in the downward direction. In response, the means 7-7' is moved to the left and the teeth 9 of the poles C-C' are placed in alignment with teeth 6 of means 1 due to the resultant magnetic forces achieving a stable condition. Once again, the stepper motor has been incremented a distance of two-thirds Wt. Also, the teeth 9 of the pols A and A', and B and B' are displaced with respect to the teeth 6 of the means 1 in the aforementioned one-third coincident relationship. It should be noted that the flux 43 passes through the pole pairs B-B' in the same direction as the flux 42 in the preceding step.

Figure 6D:
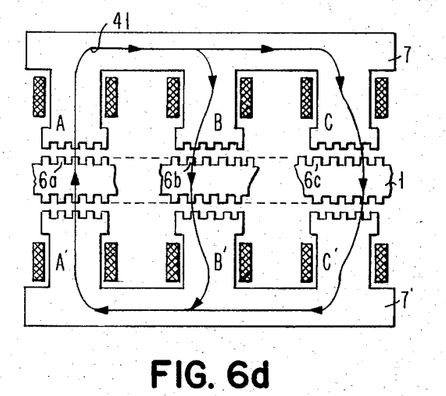
Figure 6E:
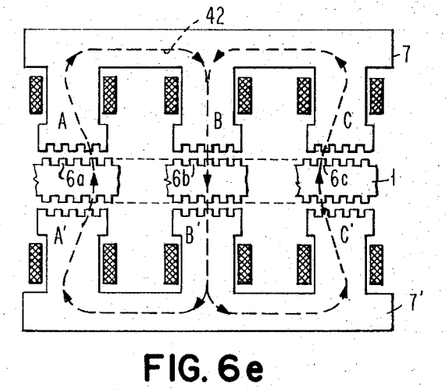
Figure 6F:
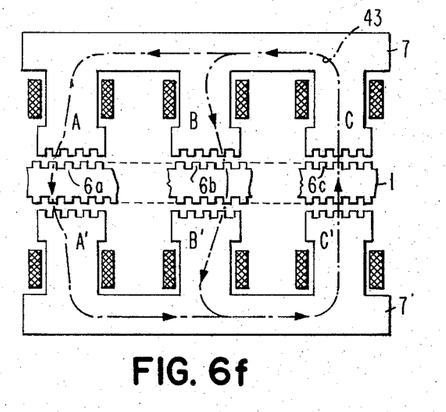

In the given example, the series connected windings $a2-a2'$, $b2-b2'$, and $c2-c2'$ are next sequentially energized resulting in the detent positions shown in FIGS. 6d-6f, respectively. The operation is similar to that described for FIGS. 6a-6c. It should be noted, however, that the flux paths 41-43 in FIGS. 6d-6f are reversed with respect to their counterparts 41-43 shown in FIGS. 6a-6c, respectively. As such, the means 7-7' is incremented one full step in each of the FIGS. 6d-6f, as indicated by the respective alignments of the tooth 6a with the second tooth from the left of the pole A in FIG. 6d, the alignment of the tooth 6b with the second tooth from the left of pole B in FIG. 6e, and the alignment of the tooth 6c with the second tooth from the left of pole C in FIG. 6f. In each of the FIGS. 6a-6f, it should be noted that the selected series connected windings provide a magnetic flux through the pole path associated with the series connected winding selected in the preceding step in the same direction as the direction of the magnetic flux which was passed through the lastmentioned pole path during the preceding step.

For the particular energization sequence of FIGS. 5a and 6a-6f, the means 7-7' is incrementally moved in one direction along the axis R. It should be understood, however, that by reversing the sequence of FIG. 5a, the means 7-7' may be incremented in the opposite direction. Moreover, in any detent or incremented position, the means 7-7' may be selectively incremented to the left or the right, if desired. In either event, the selected series connected windings provides magnetic flux through the pole path associated with the series connected winding selected in the preceding step which is in the same direction as the direction of the magnetic flux passing through the lastmentioned pole pair during the preceding step.

Referring now to FIGS. 7a-7f, a double phase operational mode using the exemplary sequence shown in FIG. 5b, for incrementing the motor 1 will now be described. For sake of brevity, only the incrementing associated with FIG. 7a will be explained in detail, as the incrementing associated with FIGS. 7b-7f will be obvious therefrom. More specifically, when the series connected windings $a1-a1'$ and $c2-c2'$ are to be concurrently energized, switches 31 and 36 are closed. Under these conditions, means 7-7' is incremented with respect to the means 1. For the aforementioned spatial relationship set forth in equation (1) above, the two-thirds left-hand portions, as viewed facing FIG. 7a, of the teeth 9 of pole pairs A-A' are aligned with the two-thirds right-hand portions of the respective teeth 6 of means 1. Also, the two-thirds right-hand portions of the teeth 9 of pole pair C-C' are aligned with the two-thirds left-hand portions of the respective teeth 6 of member means 1. The teeth 6 of pole pair B-B', on the other hand are aligned with the grooves 5 of means 1, thus producing a maximum reluctance path with respect to the aligned teeth 6 of the other two pole pairs. The flux paths 41 and 43 provided by the energized series connected windings $a1-a1'$ and $c2-c2'$ flow through each of the pole pairs A-A' and C-C' in the same direction and flow in opposite directions through the pole pairs B and B' where they effectively cancel each other out. As a result, the flux passes mainly through the paths including the energized pole pairs A-A' and B-B', and hence, the magnetic forces associated with the flux paths 41 and 43 are in a balanced or equilibrium condition.

Concurrent energization of the series connected windings $a1-a1'$ and $b1-b1'$ is next caused by appropriate action of the sequencer 30, to wit: opening switch 36, closing switch 32 and maintaining switch 31 closed. The magnetic forces are temporarily unbalanced, and the pole structure means 7-7' moves to the left until the forces once again become balanced when the two-thirds portion of teeth 6 of pole pairs A-A' and B-B' are aligned in a counterbalancing manner with the two-third portions of the teeth 8 of means 1 as shown in FIG. 7b.

Figure 7A:
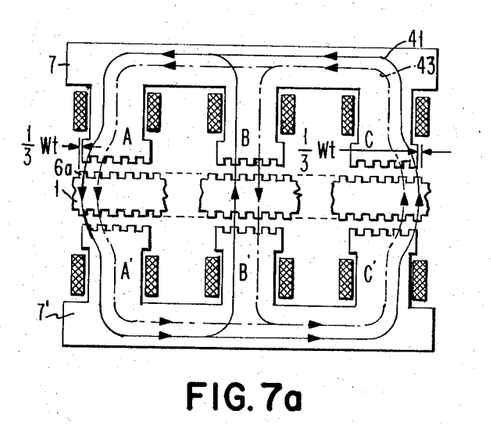
Figure 7B:
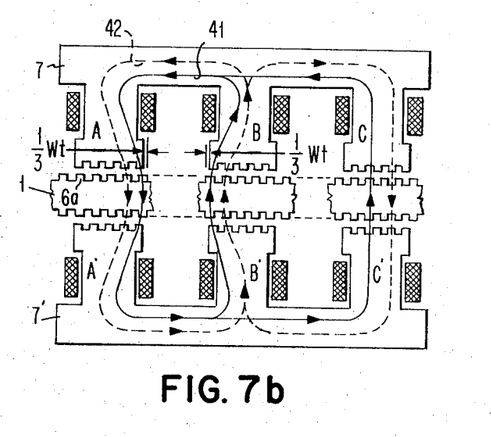
Figure 7C:
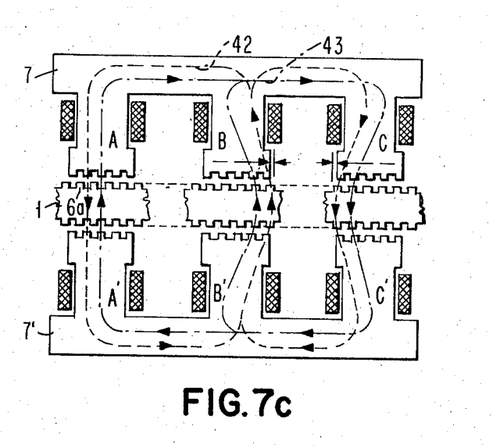
Figure 7D:
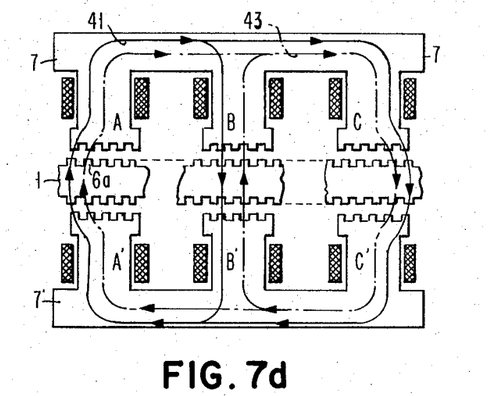

Using the aforementioned reference tooth 6a as a reference point, it can be readily demonstrated that the pole structure means 7–7' is incremented one whole or full step, i.e., two-thirds Wt from the position of FIG. 7a to the position of FIG. 7b. Moreover, as shown in FIG. 7b, the two-thirds left-hand portion of tooth 6a is in alignment with the two-thirds right-hand portion of the left tooth of the pole A as a result of the motors having been incremented one full step from the previous position of FIG. 7a. The subsequent incremental steps of the motor utilizing the sequence of FIG. 5b are shown in FIGS. 7c–7f.

For the particular energization sequence of FIGS. 5b and 7a–7f, the means 7–7' is incrementally moved in one direction along the axis R. It should be understood, however, that by reversing the sequence of FIG. 5b, the means 7–7' may be incremented in the opposite direction. Moreover, in any detent or incremented position, the means 7–7' may be selectively incremented to the left or the right, if desired. In either event, the selected series connected windings provides magnetic flux through the pole path associated with the series connected winding selected in the preceding step which is in the same direction as the direction of the magnetic flux passing through the lastmentioned pole pair during the preceding step.

To visualize, the alternate single and double phase energization mode using the sequence example of FIG. 5c, the FIGS. 6a–6f and FIGS. 7a–7f are utilized in the following sequence, to wit: FIGS. 7a, 6a, 7b, 6b, 7c, 6c, 7d, 6d, 7e, 6e, 7f, 6f. Using the lastmentioned figure sequence and reference tooth 6a, it can be readily demonstrated that the motor is incremented one-half step, i.e., ½(⅔Wt) = ⅓Wt. to the left from each preceding FIGURE of the sequence. Under these conditions, sequencer 30 provides control signals which operate the switches 31 – 36 in the appropriate manner to energize the series connected windings for the alternate single and double phase operational mode. Again, it should be understood, that reversing the sequence of FIG. 5c causes the means 7–7' to be incremented in the opposite direction. Moreover, in any detent or incremented position, the means 7–7' may be selectively incremented to the left or the right, if desired. In either event, the selected series connected windings provide magnetic flux through the pole path associated with the series connected windings selected in the preceding step which is in the same direction as the direction of the magnetic flux passing through the lastmentioned pole pair during the preceding step.

Figure 7E:
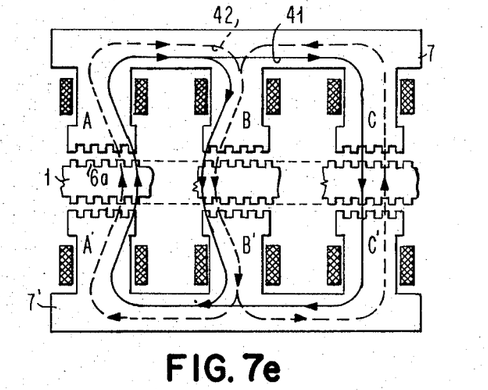
Figure 7F:
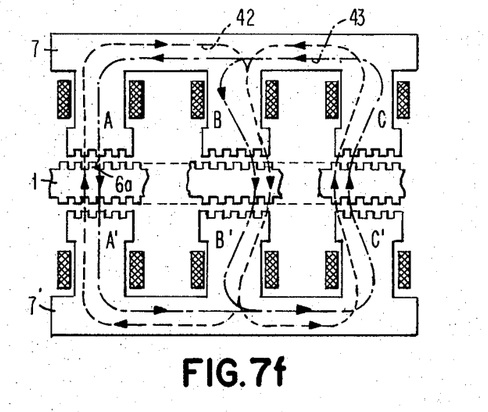

By way of explanation, referring to FIG. 7e, it should be noted that the flux 42 of FIG. 7e, which is produced by series connected windings b2–b2', passes through the pole pair A–A' in the same direction as the flux 41, which is produced by series connected windings a2–a2', of FIG. 6d passing through the pole pairs A–A'. In that case, the motor incremented to the left from the position of FIG. 6d to the position of FIG. 7e. In the case, where the motor is incremented from the position of FIG. 6e to the position of FIG. 7e, it should be noted that the flux 42 of FIG. 7e passes through the pole pair C–C' in the same direction as the flux 42, which is produced by the series connected windings b2–b2', of FIG. 6f passing through the pole pair C–C'.

Figure 8:
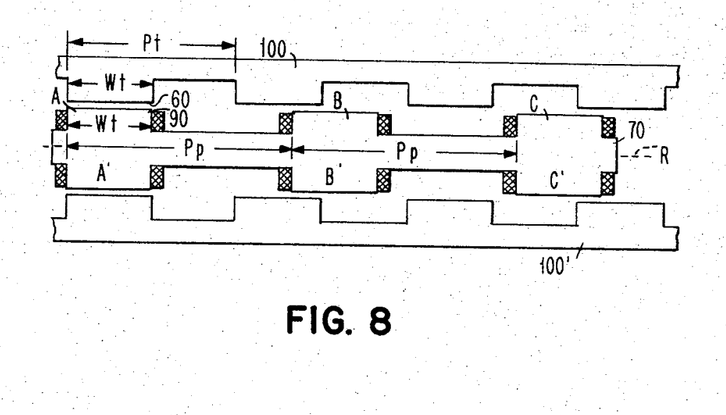
FIG. 8 is another embodiment of the present invention.

The invention may be configured in other forms. For example, in FIG. 8, there is shown another embodiment of the present invention. In this embodiment, the variable reluctance member means 100–100' is comprised of two sub-members 100 and 100' which are disposed on opposite sides of the reference axis R and the three pole pair member means 70 is disposed between the sub-members 100 and 100'. Each of the poles A, A', B, B', C, C' has two windings which are interconnected and poled in an identical manner as the windings of the embodiment of FIGS. 1–4. The embodiment of FIG. 8 is also referred to as an insideout motor. Preferably, the sub-members 100 and 100' are stationary and the means 70 is movable. By way of example, member 70 is shown as having one tooth 90 per pole face which has the same width Wt and pitch Pt as the teeth 60 of members 100 and 100'. The operation of the embodiment of FIG. 8 is similar to that of FIGS. 1–3 and hence, is omitted for sake of brevity.

Figure 9:
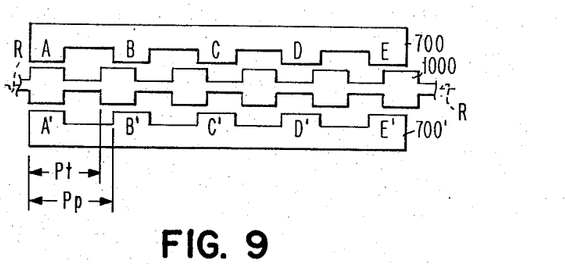
FIG. 9 is still another embodiment of the present invention.
Figure 10:
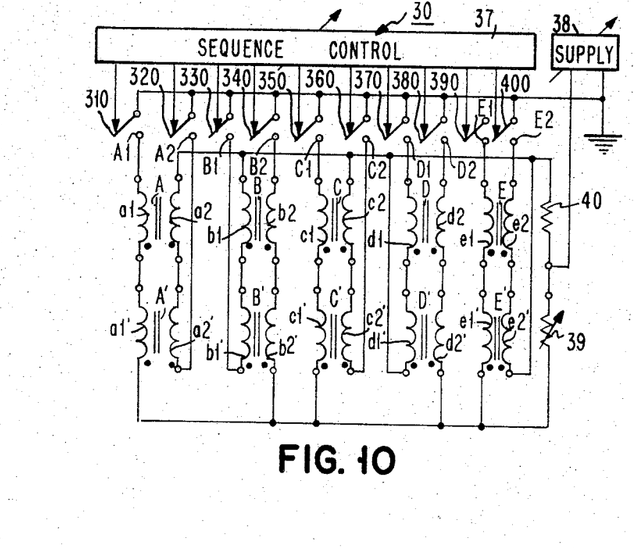
FIG. 10 is a schematic view, partially in block form, of the energization means and windings of the electromagnets of the embodiment of FIG. 9.

In FIG. 9, there is shown a five pole pair embodiment of the present invention. It includes the variable reluctance member means 1,000 and a five pole pair member means 700–700'. The latter includes two members 700 and 700' carrying the respective poles A, B, C, D, E, and A', B', C', D', and E'. The pole member means 1000 has one tooth per pole face. The two windings associated with each pole and their respective inter- and intra-connections are shown in FIG. 10, the reference characters utilized therein being similar to those used in FIG. 4 for sake of clarity. Typical single phase, double phase and alternate single and double phase energization modes for the embodiment of FIG. 9 corresponding to the sequence examples shown in FIGS. 5a–5c, for the embodiments of FIGS. 1–4 or FIG. 8, are indicated in Tables I–III, respectively, as follows:

| Table I — Single Phase |
|---|
| 1) a1–a1' |
| 2) b1–b1' |
| 3) c1–c1' |
| 4) d1–d1' |
| 5) e1–e1' |
| 6) a2–a2' |
| 7) b2–b2' |
| 8) c2–c2' |
| 9) d2–d2' |
| 10) e2–e2' |

| Table II — Two Phase |
|---|
| 1) a1–a1', e2–e2' |
| 2) b1–b1', a1–a1' |
| 3) c1–c1', b1–b1' |
| 4) d1–d1', c1–c1' |
| 5) e1–e1', d1–d1' |
| 6) a2–a2', e1–e1' |
| 7) b2–b2', a2–a2' |
| 8) c2–c2', b2–b2' |
| 9) d2–d2', c2–c2' |
| 10) e2–e2', d2–d2' |

| Table III — Alternate Phase |
|---|
| 1) a1–a1', e2–e2' |
| 2) a1–a1' |
| 3) b1–b1', a1–a1' |
| 4) b1–b1' |
| 5) c1–c1', b1–b1' |
| 6) c1–c1' |
| 7) d1–d1', c1–c1' |
| 8) d1–d1' |
| 9) e1–e1', d1–d1' |
| 10) e1–e1' |
| 11) a2–a2', e1–e1' |
| 12) a2–a2' |
| 13) b2–b2', a2–a2' |
| 14) b2–b2' |
| 15) c2–c2', b2–b2' |
| 16) c2–c2' |
| 17) d2–d2', c2–c2' |
| 18) d2–d2' |
| 19) e2–e2', d2–d2' |
| 20) e2–e22' |

It should be understood, as is apparent to those skilled in the art, that the invention may be configured in still other forms. For example, as aforementioned, the pole member means may be maintained stationary and the variable reluctance member means moved relative thereto.

Moreover, the various embodiments are shown as being incremented periodically and in synchronism, cf. waveforms of FIGS. 5a–5c. However the motor of the invention may be incremented aperiodically and/or asynchronously so that the motor can dwell a finite or indefinite time period, as desired, at any of the detent positions. Moreover, by changing the periodicity of the energizing signals, the motor speed can be adjusted accordingly. The motor is thus capable of moving at a fixed and continuous rate or it may be moved at discrete and adjustable time intervals. As is apparent to those skilled in the art, once the motor is moved to the desired detent position and the magnetic forces are in equilibrium, the windings may be de-energized and the moving member will remain in the particular detent position. However, by maintaining the energization in the windings, a positive "locked-in" or latching effect is provided.

As described herein, the two series connected winding circuits associated with each pole pair are poled in opposite direction and the energization source provides the same polarity of energization to each at the respective switch contact inputs to which the series connected windings are connected. This allows the two series connected winding circuits of each pole pair to be energized in opposite directions. As is apparent to those skilled in the art, the two series connected winding circuits of each pole pair may be poled in the same direction, in which case a series connected windings circuit is provided with energization of one polarity and the other is provided with energization of opposite polarity.

Thus, while the invention has been particularly shown and described with reference to preferred embodiments thereof, it will be understood by those skilled in the art that various changes in form and detail may be made therein without departing from the spirit and scope of the invention.

We claim:

1. A linear stepper motor having a predetermined reference axis and being of the variable reluctance type, said motor comprising:

first magnetic member means having first and second surfaces disposed on first and second opposite sides, respectively, of said reference axis, said first member means having a predetermined variable reluctance characteristic at said first and second surfaces, second magnetic member means having an odd plural number of pole pairs of electromagnetic poles with respective pole faces, the pole face of one pole of each said pole pair being disposed on said first side of said reference axis in juxtaposition with said first surface, the pole face of the other pole of each said pole pair being disposed on said second side of said reference axis in juxtaposition to said second surface, a predetermined one of said first and second member means having first and second spaced sub-members disposed on said first and second opposite sides, respectively, of said reference axis, the other one of said first and second member means being disposed between said first and second sub-members, means for supporting said first and second member means for relative movement therebetween along said axis, each of said poles having first and second windings associated therewith, the said first windings of the poles of each particular pole pair being electrically interconnected in series aiding relationship, the second windings of the poles of each particular pole pair being electrically interconnected in series aiding relationship, and means for selectively energizing in respective predetermined stepping sequences said series connected first and second windings for at least one of the operational modes of single phase, double phase and alternate single phase and double phase energizing operational modes to provide relative movement between said first and second member means, said selective energizing means being operative during each one of said operational modes to energize said series connected first windings of each particular pole pair in a direction opposite to the direction of energization of the series connected second windings of that particular pole pair, and said selective energizing means during each successive step being operative to energize the series connected windings selected during such successive step to provide a magnetic flux in the same direction through the pole pair associated with the series connected windings selected in the preceding step as the direction of the magnetic flux passing through the lastmentioned pole pair during said preceding step.

2. A linear stepper motor according to claim 1 wherein the number of pole pairs is three.

3. A linear stepper motor according to claim 1 wherein said predetermined one of said first and second member means is said first magnetic member means.

4. A linear stepper motor according to claim 1 wherein said predetermined one of said first and second member means is said second magnetic member means.

5. A linear stepper motor according to claim 1 wherein said series connected first windings and said series connected second windings are oppositely poled.

6. A linear stepper motor according to claim 1 wherein the first and second windings of each pole are bifilar.

7. A linear stepper motor having a predetermined reference axis and being of the variable reluctance type, said motor comprising:

a first magnetic laminated member having first and second surfaces disposed on first and second opposite sides, respectively, of said reference axis, said first member having a predetermined variable reluctance characteristic at said first and second surfaces, a second magnetic member having an odd plural number of pole pairs of electromagnetic poles with respective pole faces, the pole face of one pole of each said pole pair being disposed on said first side of said reference axis in juxtaposition with said first surface, the pole face of the other pole of each said pole pair being disposed on said second side of said reference axis in juxtaposition to said second surface, said second member having first and second spaced laminated sub-members disposed on said first and second opposite sides, respectively, of said reference axis, said first member being disposed between said first and second sub-members, a support assembly for supporting said first and second members, said assembly including biasing means for providing relative movement along said axis between said first and second members, each of said poles having first and second windings associated therewith, the said first windings of the poles of each particular pole pair being electrically interconnected in series aiding relationship, the second windings of the poles of each particular pole pair being electrically interconnected in series aiding relationship, and means for selectively energizing in respective predetermined stepping sequences said series connected first and second windings for single phase, double phase and alternate single phase and double phase energizing operational modes to provide relative movement between said first and second member means, said selective energizing means being operative during each one of said operational modes to energize said series connected first windings of each particular pole pair in a direction opposite to the direction of energization of the series connected second windings of that particular pole pair, and said selective energizing means during each successive step being operative to energize the series connected windings selected during each successive step to provide a magnetic flux in the same direction through the pole pair associated with the series connected windings selected in the preceding step as the direction of the magnetic flux passing through the lastmentioned pole pair during said preceding step.

8. A linear stepper motor according to claim 7 wherein said support assembly further comprises:

first and second side frames, said first and second sub-members being removably mounted between said side frames, and plural spacer members removably mounted between said side frames to provide a predetermined spatial relationship between said side frames proportional to the size of said magnetic first and second members.

* * * * *